US007965637B1

(12) United States Patent
Trivedi et al.

(10) Patent No.: US 7,965,637 B1
(45) Date of Patent: *Jun. 21, 2011

(54) NETWORK PROXY WITH ASYMMETRIC CONNECTION CONNECTIVITY

(75) Inventors: Atul N. Trivedi, San Jose, CA (US); James K. Tosh, Fremont, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/711,069

(22) Filed: Feb. 23, 2010

Related U.S. Application Data

(63) Continuation of application No. 11/619,084, filed on Jan. 2, 2007, now Pat. No. 7,768,939.

(51) Int. Cl.
*H04L 12/26* (2006.01)
*G06F 15/16* (2006.01)

(52) U.S. Cl. .................. 370/235; 370/252; 709/228

(58) Field of Classification Search .................. None
See application file for complete search history.

(56) References Cited

U.S. PATENT DOCUMENTS

| 5,674,003 | A  | * | 10/1997 | Andersen et al. | ............ 709/228 |
| 6,078,957 | A  | * | 6/2000  | Adelman et al.  | ............ 709/224 |
| 6,748,559 | B1 | * | 6/2004  | Pfister et al.  | ............ 709/226 |
| 6,822,940 | B1 | * | 11/2004 | Zavalkovsky et al. | ...... 370/237 |
| 7,142,650 | B1 | * | 11/2006 | Kult et al.     | ............ 379/112.01 |
| 7,463,624 | B2 | * | 12/2008 | Kitazawa        | ............ 370/352 |
| 7,768,939 | B1 | * | 8/2010  | Trivedi et al.  | ............ 370/252 |
| 2003/0084161 | A1 | * | 5/2003 | Watson et al. | ............ 709/227 |
| 2003/0123451 | A1 | * | 7/2003 | Nielsen et al. | ............ 370/395.4 |
| 2006/0165067 | A1 | * | 7/2006 | Kitazawa      | ............ 370/352 |
| 2006/0262916 | A1 | * | 11/2006 | Marascio et al. | ............ 370/352 |

OTHER PUBLICATIONS

Office Action from U.S. Appl. No. 11/619,084, dated Jun. 1, 2009, 24 pp.
Response to Office Action dated Jun. 1, 2009, from U.S. Appl. No. 11/619,084, filed Aug. 13, 2009, 10 pp.
Notice of Allowance for U.S. Appl. No. 11/619,084, dated Nov. 10, 2009, 7 pp.

* cited by examiner

*Primary Examiner* — Jayanti K Patel
*Assistant Examiner* — Matthew Campbell
(74) *Attorney, Agent, or Firm* — Shumaker & Sieffert, P.A.

(57) ABSTRACT

Techniques are described in which a network device waits differing amounts of time for different network sockets before beginning processes to determine whether respective network connections from the network sockets have failed. An intermediate device may create a network socket for a network connection having a keep-alive wait time option set to a keep-alive wait time associated with a class of the network connection. If an amount of time specified by the keep-alive option of the socket passes after a last successful communication on the network connection, the socket may begin a process to determine whether the network connection has failed. If the intermediate device determines that the network connection has failed, the intermediate device may terminate the connection to free resources on the intermediate device allocated to the network connection.

24 Claims, 4 Drawing Sheets

NETWORK PROXY WITH ASYMMETRIC CONNECTION CONNECTIVITY

This application is a continuation of U.S. application Ser. No. 11/619,084, filed Jan. 2, 2007, the entire content of which is incorporated herein by reference.

TECHNICAL FIELD

The invention relates to computer networks, and particularly to computer network proxies.

BACKGROUND

The Transmission Control Protocol (TCP) is a core protocol of the Internet. Nodes on the Internet use TCP to provide connections with other nodes. Furthermore, TCP guarantees reliable and in-order delivery of packets from a sender node to a receiver node. To use TCP, a node creates a TCP connection and then begins receiving or sending packets using the connection. Because a node may communicate with hundreds of other nodes on a network, the node may have hundreds of TCP connections. Each of the TCP connections consumes resources on the node. For instance, maintenance and monitoring of a TCP connection may require processor cycles and memory resources. Under normal circumstances, a first node terminates (i.e., tears down) a TCP connection with a second node when the first node has finished communicating with the second node. In particular, the first node may send a FIN segment, to which the second node sends an ACK segment or a FIN/ACK segment.

However, in some circumstances a network connection between two nodes on a network may fail. For instance, an intermediate device may malfunction, one of the nodes may crash, or a link may be severed. As a result, a first node may not receive a FIN segment from a second node and therefore be unaware that the second node has finished communicating and has terminated the session. Therefore, the first node continues to maintain the TCP connection. Meanwhile, the TCP connection continues to consume resources.

In general, nodes use TCP sockets to manage TCP connections. Standard TCP sockets use a "KeepAlive" behavior to identify idle TCP connections that should be removed. If a "KeepAlive" option of a TCP socket for a TCP connection from a first node to a second node is turned on, the socket maintains a timer that indicates when the socket last sent or received a successful communication. If 7200 seconds (i.e., 2 hours) have passed since the last successful communication, the first node sends a TCP keep-alive segment on the TCP connection. If the socket does not receive a response to the keep-alive segment, the socket waits seventy-five seconds and then sends a second TCP keep-alive segment. If the socket does not receive a response to the second TCP keep-alive segment, the socket waits seventy-five seconds and then sends a TCP third keep-alive segment. If the socket does not receive a response to the third TCP keep-alive segment, the socket may send a fourth TCP keep-alive segment. If the socket does not receive a response to the fourth TCP keep-alive segment, the socket may terminate the TCP connection. However, if the socket receives a response to any of the keep-alive segments, the socket resets the two-hour time and maintains the TCP connection.

SUMMARY

In general, the invention relates to techniques in which a network device waits differing amounts of time for different network sockets before beginning processes to determine whether respective network connections from the network sockets have failed. As will be described in detail below, a network device, such as an intermediate network acceleration device located between a client and a server, may create a network socket for a network connection having a keep-alive wait time option set to a keep-alive wait time associated with a class of network connections. If an amount of time specified by the keep-alive option of the socket passes after a last successful communication on the network connection, the socket may begin a process to determine whether the network connection has failed. If the intermediate device determines that the network connection has failed, the intermediate device may terminate the connection to free resources on the intermediate device allocated to the network connection.

For example, a proxy node may be located between a first node and a second node on a network. The proxy node may maintain a Transmission Control Protocol (TCP) connection (i.e., session) with the first node and a separate TCP connection (session) with the second node. In this manner, the proxy node operates as a termination point for each of the TCP connections, and may relay information between the network stacks associated with the different sessions. The proxy node may receive TCP segments from the first node on the first TCP connection, perform some processing on the TCP segments, and resend the processed TCP segments to the second node on the second connection. For instance, the proxy node may receive encrypted TCP segments, decrypt the TCP segments, and resend the decrypted TCP segments to the second node. The connection between first node and the proxy node and the connection between the proxy node and the second node may have differing characteristics. For instance, the first node may be a client device and the second node may be a server device. Because client devices may communicate with the server device for limited times, the proxy node may set the keep-alive wait time for TCP connections with the client device to a shorter period. Furthermore, because the proxy node is more likely to communicate with the server device over a longer time, the proxy node may set the keep-alive wait time for TCP connections with the server device to a longer period. Moreover, the proxy node may set keep-alive wait times based on other factors including classes of network addresses, port numbers, application-layer protocols, requested services, and so on. By setting the keep-alive wait times for different TCP connections to different keep-alive wait times, the proxy node may be able to optimize its resource utilization by reducing the number of unneeded TCP connections.

In one embodiment, a method comprises storing, with a network device, respective wait times for a plurality of classes of network connections for a network protocol. In this embodiment, each of the wait times defines a time to wait before initiating a process to determine whether a network connection for the respective classes of network connections has failed. Furthermore, at least two of the wait times for the plurality of classes of network connections specify different wait times. The method also comprises establishing a socket with the network device for a network connection to a second network device. The network connection is associated with a first one of the plurality of classes of network connections. In addition, the method comprises initiating the process to determine whether the network connection has failed when the wait time for the first one of the plurality of classes of network connections has passed since a last successful communication on the second network connection In another embodiment, a network device comprises a socket creation module to establish a first socket of a network device to manage a first network connection that is a member of a first class of network connections in a network protocol and to establish a second socket of the network device to manage a second network connection that is a member of a second class of network connections in the network protocol. The first socket determines whether the first network connection is still active when an amount of time that has passed since a last successful communication on the first network connection exceeds a first time for the first class of network connections. The second socket determines whether the second network connection is still active when an amount of time that has passed since a last successful communication on the second network connection exceeds a second time for the second class of network connections. The network connection keep-alive wait time of the first socket is different than the network connection keep-alive wait time for the second socket.

In another embodiment, a computer-readable medium comprises instructions. The instructions cause a programmable processor to establish a first socket of a network device to manage a first network connection that is a member of a first class of network connections in a network protocol. The instructions also cause the processor to establish a second socket of the network device to manage a second network connection that is a member of a second class of network connections in the network protocol. In addition, the instructions cause the processor to determine whether the first network connection is still active when an amount of time equal to a first time for the first class of network connections has passed since a last successful communication on the first network connection. The instructions also cause the processor to determine whether the second network connection is still active when an amount of time equal to a second time for the second class of network connections has passed since a last successful communication on the second network connection. In this embodiment, the network connection keep-alive wait time of the first socket is different than the network connection keep-alive wait time for the second socket.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
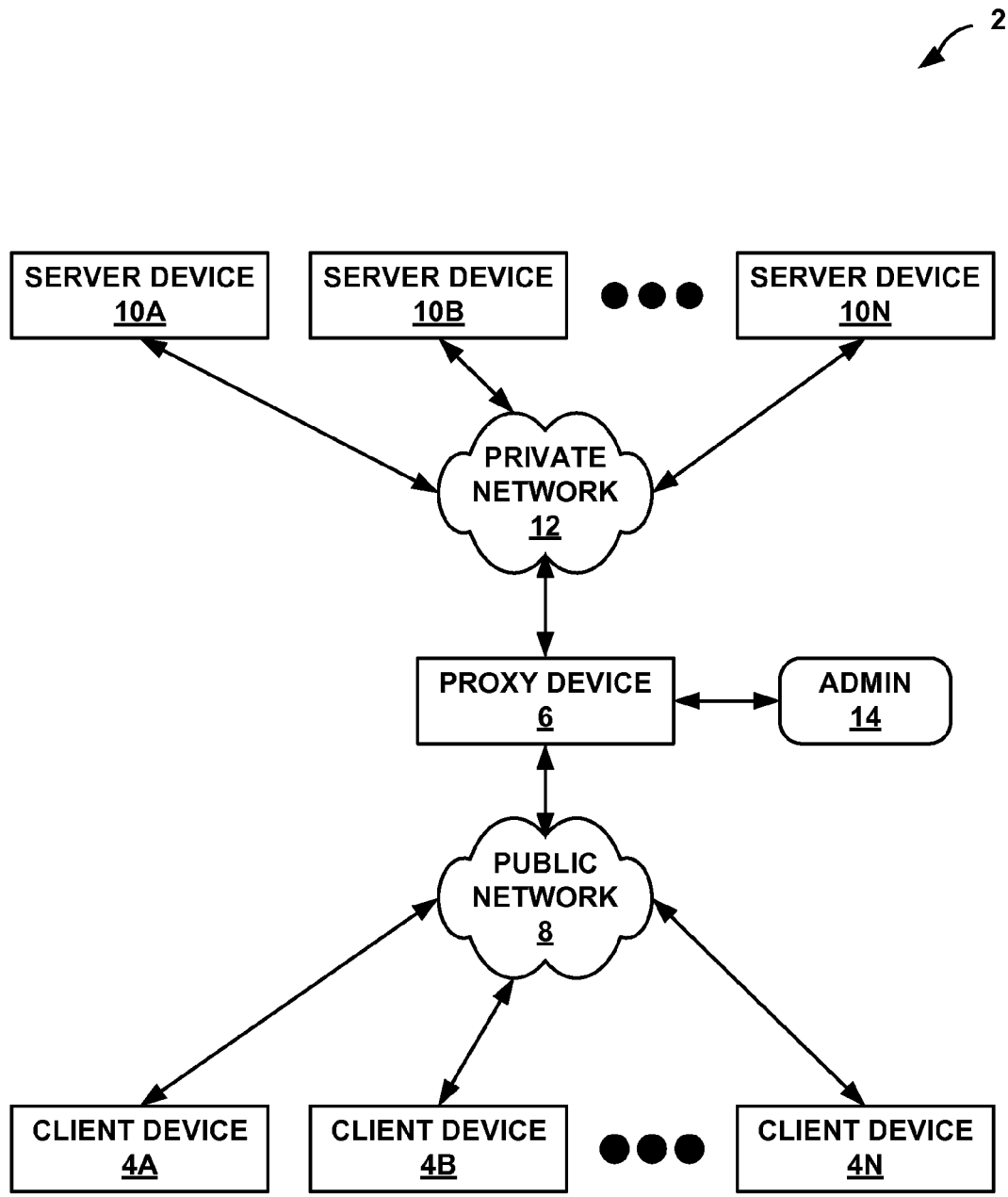
FIG. 1 is a block diagram illustrating an exemplary system in which a proxy device maintains differing keep-alive wait times for different classes of Transmission Control Protocol (TCP) connections.

FIG. 1 is a block diagram illustrating an exemplary system 2 in which a proxy device 6 maintains differing "keep-alive wait times" for different classes of Transmission Control Protocol (TCP) connections. The term "keep-alive wait time" is used herein in reference to a period of time a network device waits before initiating a keep-alive procedure or other procedure to probe an individual network connection (e.g., TCP session) and determine whether the connection should be terminated. System 2 includes a set of client devices 4A through 4N (collectively client devices 4). Client devices 4 may represent one of several types of devices. For example, client devices 4 may be personal computers, network telephones, television set-top boxes, gaming platforms, mobile telephones, network servers, intermediate network devices, network appliances, and so on.

Client devices 4 may communicate with each other and with proxy device 6 through a public network 8. Public network 8 may be a public computer network such as the Internet. In other embodiments of the invention, public network 8 may be a private network such as a local area network, a metropolitan area network, a wireless network, a cellular network, a telephone network, or otherwise. In addition to acting as a simple proxy, proxy device 6 may also provide server load balancing, global server load balancing, secure sockets layer (SSL) encryption and termination, Hyper-Text Transfer Protocol (HTTP) compression, application security, and so on.

System 2 also includes a set of server devices 10A through 10N (collectively, server devices 10). Server devices 10 may be any of several types of logical or physical devices. For example, server devices 10 may be Web servers, application servers, file transfer protocol (FTP) servers, file servers, network data centers, network security devices, and so on. Server devices 10 may communicate with each other and with proxy device 6 through a private network 12. Private network 12 may be a secured private network such as a corporate or personal LAN, a virtual private network (VPN), or otherwise. In some embodiments, private network 12 may not necessarily be private. For instance, private network 12 may be the Internet.

When one of client devices 4 seeks to communicate with one of server devices 10, that client device may establish a TCP connection with proxy device 6 by way of one or more application-layer socket calls to an operating system executing on the client device. During this process, client device 4A may send a Transmission Control Protocol (TCP) SYN segment to proxy device 6 to initiate set up of a TCP connection. In response, proxy device 6 may send a TCP SYN-ACK segment to client device 4A. In response, client device 4A may send an ACK segment to proxy device 6. In this way, client device 4A and proxy device 6 may establish a TCP connection with one another. After one of client devices 4 establishes a TCP connection with proxy device 6, the client device may send one or more TCP segments to proxy device 6.

Upon receiving TCP segments, proxy device 6 may remove the payloads of the TCP segments and may or may not perform some operations on the payloads. For instance, proxy device 6 may rewrite one or more fields in the payloads, decrypt the payloads, decompress the payloads, compress the payloads, and so on. Subsequently, proxy device 6 may determine whether a TCP connection exists from proxy device 6 to one of server devices 10 that acts as a destination server of the payloads. If a TCP connection exists from proxy device 6 to the destination server, proxy device 6 may send the payloads through that TCP connection to the destination server. Otherwise, if a TCP connection does not exist from proxy device 6 to the destination server, proxy device 6 may create a new TCP connection to the destination server. Proxy device 6 may then send the payloads through the new TCP connection to the destination server. In this way, communications from client devices 4 to server devices 6 travel through at least two separate TCP connections.

When proxy device 6 establishes a TCP connection with another device, proxy device 6 makes a determination as to how to classify the connection. For example, if client device 4A sent a request to establish a TCP connection (i.e., a TCP SYN segment), proxy device 6 may determine that client device 4A has a network address in a certain subnet. Based on this network address, proxy device 6 may, for example, determine that the requested TCP connection is a member of a class of TCP connections with client devices, and this class of TCP connections may be assigned with longer keep-alive wait times relative to a class for server-related TCP connections.

After proxy device 6 determines a classification for the requested TCP connection, proxy device 6 may obtain a class-specific keep-alive wait time for the requested TCP connection from a configuration file, database or other source. The keep-alive wait time for a TCP connection is a measure of how long proxy device 6 should wait after the last successful communication on the TCP connection before initiating a test to probe the connection and determine whether the TCP connection should be maintained, e.g., by sending keep-alive probes on the TCP connection. For example, for client TCP connections, the keep-alive wait time may specify that proxy device 6 should wait 7200 seconds (2 hours) after the last successful communication on the TCP connection before sending probes to test whether the TCP connection is still active. Once proxy device 6 has obtained configuration data specifying a keep-alive wait time for the requested TCP connection, proxy device 6 may create a network socket for the TCP connection having a socket keep-alive wait time option set to the keep-alive wait time obtained from the configuration file. If the configuration file does not include a keep-alive wait time associated with the class of TCP connection, proxy device 6 may use a default keep-alive wait time instead. For example, if the configuration file does not specify a keep-alive wait time for the class of a TCP connection, or if the TCP connection is unclassified, proxy device 6 may use a default keep-alive time of 7200 seconds for general connections or 600 seconds for proxy connections.

The configuration file may be managed in several ways. For example, an administrator 14 may access a user interface of proxy device 6 to set keep-alive wait times for user-defined classes of TCP connections specified by address range, protocol, application type, port, or combinations thereof. In another example, an optimization module on proxy device 6 may receive statistical information about differing classes of TCP connections. For instance, the optimization module may receive information that describes an average length of a TCP connection to a specific one of server devices 10. The optimization module may then update the configuration file to set optimum keep-alive wait times for different types of connections based on an analysis of the statistical information.

This invention may provide one or more advantages. For instance, proxy device 6 may make more efficient use of its resources by terminating certain classes of TCP connections sooner than other classes of TCP connections. For example, proxy device 6 may be able to use its resources more efficiently by setting shorter keep-alive wait times for TCP connections to client devices in relation to keep-alive wait times for TCP connections to server devices. In another example, proxy device 6 may recognize that client devices connecting to a specific service provided by server devices may regularly access the specific resource. For example, client devices may regularly access an email server to check email. It may be advantageous to maintain TCP connections to the email server longer than TCP connections to a web server that is generally accessed only once.

Figure 2:
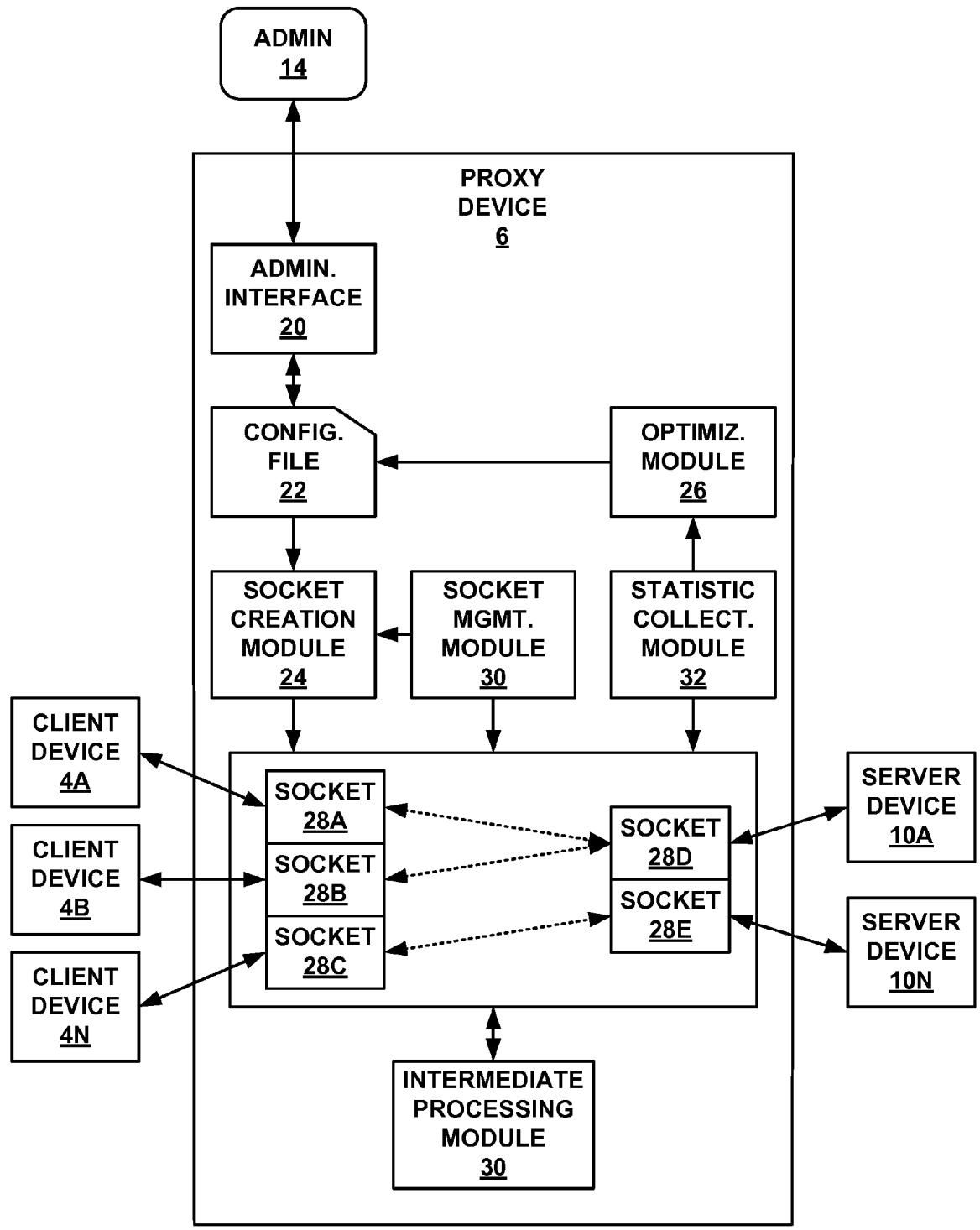
FIG. 2 is a block diagram illustrating an exemplary proxy device that may implement one or more embodiments of the invention.

FIG. 2 is a block diagram illustrating an exemplary proxy device 6 that may implement one or more embodiments of the invention. In general, proxy device 6 includes an administrative interface 20, a configuration file 22, a socket creation module 24, an optimization module 26, a set of sockets 28, a socket management module 30, and a statistics collection module 32. These modules may be implemented in software or in hardware. Moreover, functionalities of these modules may be distributed among the modules or incorporated into modules not illustrated in the example of FIG. 2.

Administrator 14 may interact with proxy device 6 using administrative interface 20. For instance, administrative interface 20 may be a Web interface, a console interface, a command-line Telnet/Secure Shell interface, File Transfer Protocol interface, or otherwise. Using administrative interface 20, administrator 14 may provide configuration input to proxy device 6 relevant to setting keep-alive wait times for differing classes of TCP connections maintained by network device 6. For example, administrator 14 may provide input that directly specifies a keep-alive wait time for a class of TCP connections between network device 6 and network devices having network addresses in a specific subnet. In another example, administrator 14 may provide input that describes a ratio of keep-alive wait times for different classes of TCP connections. For instance, administrator 14 may specify that TCP connections with client devices having destination network addresses in a specific subnet should have keep-alive wait times twice as long as the keep-alive wait times for servers having network addresses within a different subnet. Furthermore, administrator 14 may define the class of TCP connections based on protocol (e.g, File Transfer Protocol (FTP), Hypertext Transfer Protocol (HTTP), Simple Network Management Protocol (SNMP), and so on), application type, port, or combinations thereof.

Furthermore, administrator 14 may provide input that specifies a default keep-alive wait time of all classes of TCP connections. Administrator 14 may also provide input that specifies that proxy device 6 should not use the keep-alive mechanism for a specific class or classes of TCP connections. Administrator 14 or other network devices may also use Simple Network Management Protocol to view the keep-alive wait times.

When administrative interface 20 receives input from administrator 14 regarding keep-alive wait times, administrative interface 20 may update configuration file 22. Configuration file 22 may persistently or temporarily store keep-alive wait time information, and other forms of data structures may be used.

Proxy device 6 may accept TCP connections from client devices 4 and server devices 10. When proxy device 6 receives a request from a network device to establish a TCP connection (e.g., a TCP SYN segment), socket creation module 24 may identify the requested TCP connection as being a member of a particular class of TCP connections. In this context, a class of TCP connections may simply represent a set of TCP connections sharing one or more common characteristics that may serve as a basis for categorizing the TCP connections for purposes of assigning keep-alive wait times. For example, socket creation module 24 may identify all TCP connections having a common destination address as being members of a class of TCP connections.

After socket creation module 24 determines that the requested TCP connection is a member of a particular class of TCP connections, socket creation module 24 determines whether configuration file 22 specifies a particular keep-alive wait time for the identified class of TCP connections. If configuration file 22 specifies a particular keep-alive wait time for the identified class of TCP connections, socket creation module 24 retrieves the particular keep-alive wait time from configuration file 22. If configuration file 22 does not specify a particular keep-alive wait time for the class of TCP connections, socket creation module 24 may retrieve a default keep-alive wait time specified in configuration file 22. Socket creation module 24 then creates a new one of network sockets 28 to handle the requested TCP connection and set a keep-alive option of the network socket to the keep-alive wait time retrieved from configuration file 22. For example, socket creation module 24 may create socket 28C to handle a TCP connection from client device 4N to proxy device 6.

After creating the new network socket, socket management module 30 may determine whether a TCP connection exists from proxy device 6 to a server device identified in the connection request. If such a TCP connection already exists, socket management module 30 may use an existing one of TCP sockets 28 to forward to the server device any network traffic received from the client via the new network socket. In this way, socket management module 30 may reuse existing TCP sockets from proxy device 6 to server devices 10. On the other hand, if such a TCP connection does not yet exist, socket management module 30 may instruct socket creation module 24 to create a new TCP socket for a TCP connection from proxy device 6 to the server devices. Upon receiving the request from socket management module 30, socket creation module 24 may identify the TCP connection requested by socket management module 30 as being a member of a particular class of TCP connections based on the criteria specified within configuration file 22. For instance, socket creation module 24 may determine that a prospective TCP connection from proxy device 6 to server device 10A would be a TCP connection to an email server. After identifying the requested TCP connection as a member of a particular class of TCP connections, socket creation module 24 may determine whether configuration file 22 specifies a particular keep-alive wait time for the identified class of TCP connections. If configuration file 22 specifies a particular keep-alive wait time for the identified class of TCP connections, socket creation module 24 retrieves the particular keep-alive wait time from configuration file 22.

Socket creation module 24 may then create a network socket (e.g., socket 28D) to handle the requested TCP connection. When socket creation module 24 creates a network socket, socket creation module 24 may set a keep-alive wait time option of the network socket to the keep-alive wait time retrieved from configuration file 22. For example, socket creation module 24 may use the int setsockopt ( ) function standard in many UNIX and Linux distributions to invoke an operating system of network device 6 and set the keep-alive time option of the socket being created. After socket creation module 24 interacts with the operating system to create the network socket, the network socket sends a TCP SYN segment to the server device to request to establish a TCP connection with the server device. Because the TCP connection from one of client devices 4 to proxy device 6 and the TCP connection from proxy device 6 to one of server devices 10 may be members of different classes of TCP connections, the TCP connection from client devices 4 to proxy device 6 and the TCP connection from proxy device 6 to one of server devices 10 may have different keep-alive wait times.

After socket creation module 24 creates one of sockets 28, the operating system monitors the socket and records a time of a last successful communication on the TCP connection managed by the socket. Periodically, the operating system may check the time of the last successful communication in order to determine whether an amount of time specified by the keep-alive wait time option of the socket has passed since the time of the last successful communication. If the operating system determines that the amount of time specified by the keep-alive wait time option of the socket has passed since the time of the last successful communication, the operating system determines whether the TCP connection has failed or is still active. For example, operating system may begin a process of sending TCP keep-alive segments through the TCP connection for socket 28A when the amount of time specified by the keep-alive wait time option for socket 28A has transpired since the last successful transmission or reception of information on the TCP connection managed by socket 28A. Furthermore, in some embodiments, administrator 14 may specify how much time socket 28A should wait between sending each TCP keep-alive.

Statistical collection module 34 may collect statistical information about TCP connections from sockets 28. For instance, statistical collection module 34 may calculate average durations of TCP connections in particular classes of TCP connections. In another example, statistical collection module 34 may retain counters for the number of TCP connection timeouts, and so on. Optimization module 26 may retrieve this statistical information from statistical collection module 34. Optimization module 26 may then use the statistical information to calculate optimum keep-alive wait times for classes of TCP connections. After calculating an optimum keep-alive wait time for a class of TCP connections, optimization module 26 may update configuration file 22 to include the optimum keep-alive wait time for the class of TCP connections.

Depending on the granularity of the statistical information, optimization module 26 may be able to automatically identify new classes of TCP connections and identify optimum keep-alive wait times for the new classes of TCP connections. For instance, optimization module 26 may identify a set of current network connections having a substantially similar time until closure that is different from the wait times for the currently defined plurality of classes of network connections. For example, optimization module 26 may identify a set of network connections which typically close within five minutes of each other. Furthermore, optimization module 26 may automatically merge two or more of the classes of network connections into fewer classes of network connections when the statistical information for the current network connections indicate that two or more classes of network connections have a substantially similar time until closure. For example, if two classes of network connections typically close within five minutes of each other, optimization module 26 may merge the two classes of network connections into a single class of network connections.

Although described separately, socket creation module 24, socket management module 30, statistic collection module 32, and optimization module 26 may be integrated within an operating system of proxy device 6.

Figure 3:
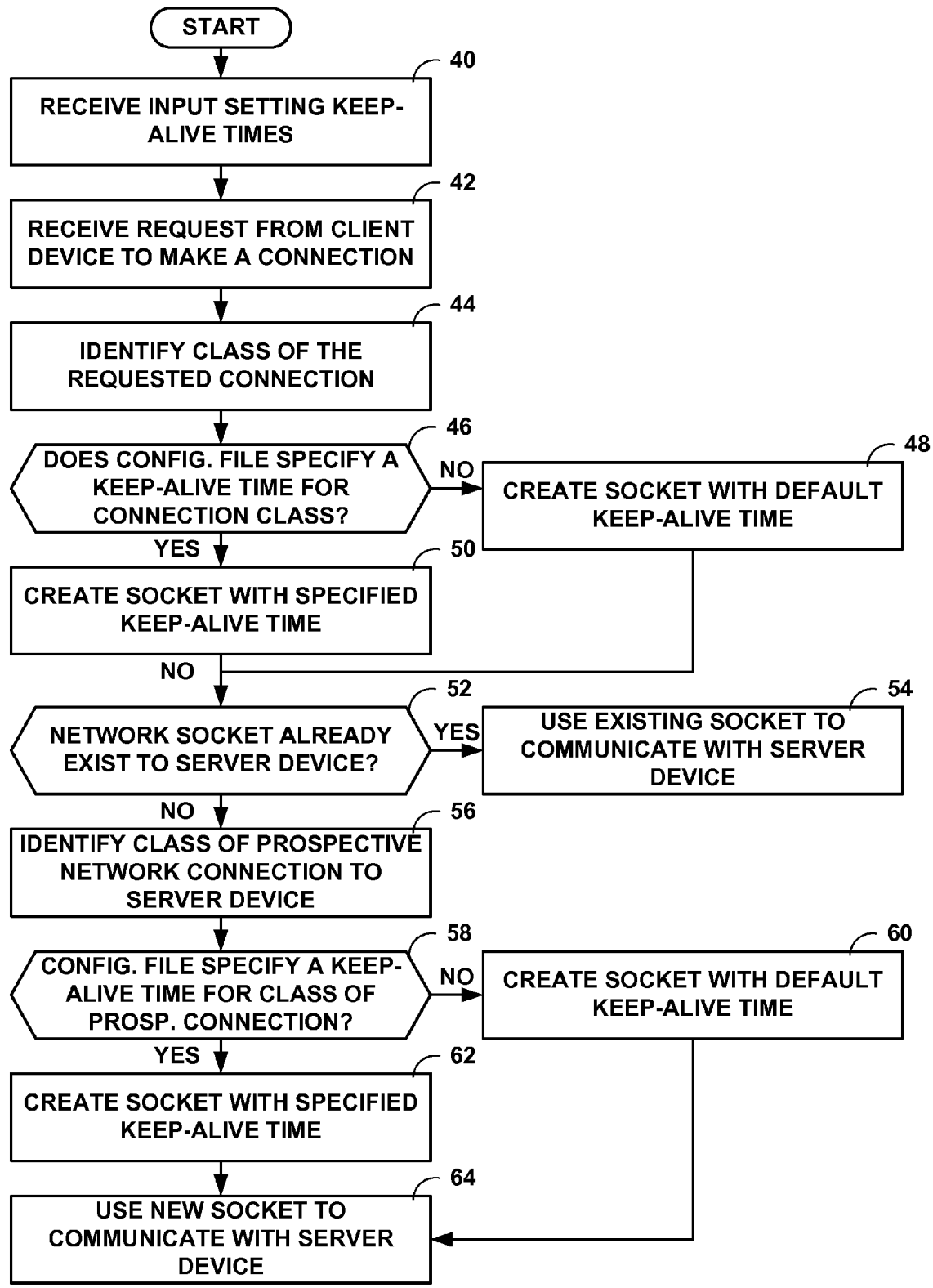
FIG. 3 is a flowchart illustrating an exemplary operation of a proxy device when receiving a request to establish a TCP connection.

FIG. 3 is a flowchart illustrating an exemplary operation when proxy device 6 receives a request to establish a TCP connection. Initially, proxy device 6 may receive configuration input that defines keep-alive wait times for one or more classes of TCP connections (40). For example, administrator 14 may enter specific keep-alive wait times for specific classes of TCP connections into proxy node 6 through administrative interface 20. In another example, proxy node 6 may receive input relevant to setting keep-alive wait times from an optimization module, such as optimization module 26, which automatically calculates keep-alive wait times for one or more classes of TCP connections.

Proxy device 6 may then receive a request from one of client devices 4 to establish a TCP connection (42). For example, proxy device 6 may receive a TCP SYN segment from client device 4A through network 8. After receiving the request to establish the TCP connection, socket creation module 24 in proxy device 6 may identify a class of the requested TCP connection (44). For instance, socket creation module 24 may identify a class of the requested TCP connection by examining a source or destination address of an Internet Protocol packet that encapsulates a TCP segment, a source or destination port of the TCP SYN segment, and so on. Alternatively, or in addition, socket creation module 24 may identify a protocol, source port and/or a destination port address.

Once socket creation module 24 has identified a class of the requested TCP connection, socket creation module 24 may determine whether configuration file 22 specifies a keep-alive wait time for the class of the requested TCP connection (46). If configuration file 22 does not specify a keep-alive wait time for the class of the requested TCP connection ("NO" of 46), socket creation module 24 may invoke the operating system of proxy device 6 to create a new one of sockets 28 for the requested TCP connection with a keep-alive wait time option of the socket set to a default keep-alive wait time (48). On the other hand, if configuration file 22 specifies a keep-alive wait time for the class of the requested TCP connection ("YES" of 46), socket creation module 24 may invoke the operating system to create a new one of sockets 28 for the requested TCP connection with a keep-alive wait time for the class of the requested TCP connection specified in configuration file 22 (50).

After socket creation module 24 creates a socket for the requested TCP connection, socket management module 30 determines whether a TCP socket exists for a TCP connection between proxy device 6 and an appropriate one of server devices 10 (52). If such a TCP socket exists ("YES" of 52), proxy device 6 may use the TCP socket to communicate to the server device TCP messages received from the TCP connection from the client device (54). If a TCP connection between proxy device 6 and an appropriate one of server devices 10 does not exist ("NO" of 52), socket creation module 24 may identify a class of a prospective TCP connection from proxy device 6 to the server device (56). After identifying a class of the prospective TCP connection, socket creation module 24 may determine whether configuration file 22 specifies a keep-alive wait time for the class of the prospective TCP connection (58). If configuration file 22 does not specify a keep-alive wait time for the class of the prospective TCP connection ("NO" of 58), socket creation module 24 may invoke the operating system to create a new one of TCP sockets 28 for a TCP connection from proxy device 6 to the server device with a keep-alive wait time option of the socket set to a default keep-alive value (60). If configuration file 22 specifies a keep-alive wait time for the class of the prospective TCP connection ("YES" of 62), socket creation module 24 invokes the operating system to create a new one of TCP sockets 28 with the keep-alive wait time option of the new socket set to the keep-alive wait time specified in configuration file 22 (64). Proxy device 6 may then use the new TCP socket to manage TCP communications with the server device (66).

Figure 4:
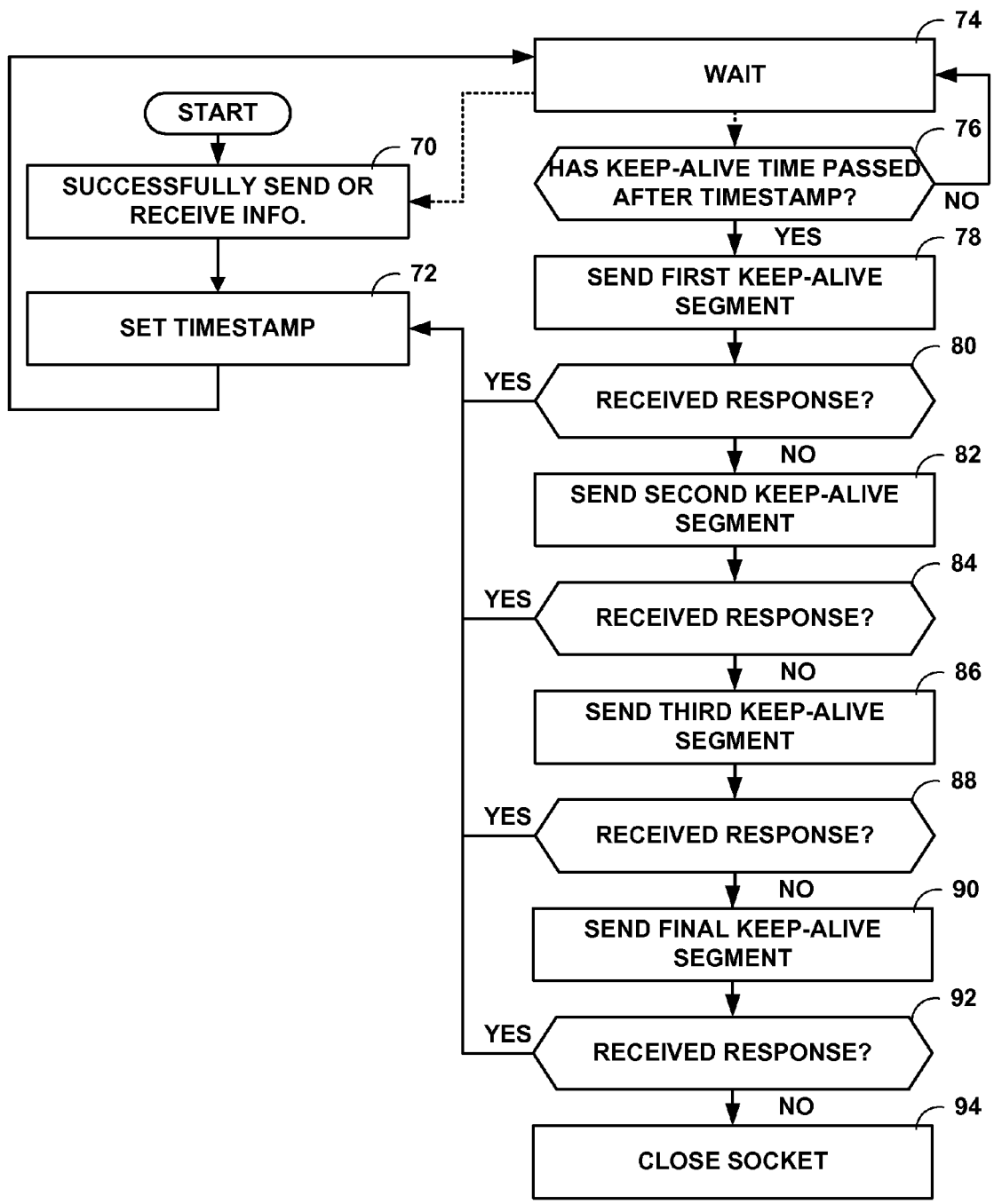
FIG. 4 is a flowchart illustrating an exemplary operation of a network device when managing a TCP socket in accordance with an embodiment of the invention.

FIG. 4 is a flowchart illustrating an exemplary operation of a network device when managing an operating system TCP socket in accordance with an embodiment of the invention. Initially, one of TCP sockets 28 (e.g., TCP socket 28A) in proxy device 6 may successfully send or receive information on a TCP connection associated with the TCP socket (70). After successfully sending or receiving the information, TCP socket 28A may set a timestamp to record the time of the last successful transmission or reception of information on the TCP connection (72).

After TCP socket 28A sets the timestamp, TCP socket 28A may then wait until TCP socket 28A successfully sends or receives new information (74). In addition, while TCP socket 28A is waiting, TCP socket 28 may determine whether the keep-alive wait time for TCP socket 28 has passed since TCP socket 28 set the timestamp (76). If the keep-alive wait time for TCP socket 28 has not passed since TCP socket 28 set the timestamp ("NO" of 76), TCP socket 28 continues to wait (74).

If the keep-alive wait time for TCP socket 28 has passed since TCP socket 28 set the timestamp ("YES" of 76), TCP socket 28 sends a first keep-alive segment on the TCP connection (78). TCP socket 28 may then wait a specified period and then determine whether TCP socket 28 received a response to the first keep-alive segment (80). If TCP socket 28 received a response to the first keep-alive segment ("YES" of 80), TCP socket 28 sets the timestamp to the current time (72) and continues waiting (74). If TCP socket 28 did not receive a response to the first keep-alive segment in the specified period ("NO" of 80), TCP socket 28 sends a second keep-alive segment on the TCP connection (82). TCP socket 28 may then wait a specified period and then determine whether TCP socket 28 received a response to the second keep-alive segment (84). If TCP socket 28 received a response to the second keep-alive segment ("YES" of 84), TCP socket 28 sets the timestamp to the current time (72) and continues waiting (74). If TCP socket 28 did not receive a response to the second keep-alive segment in the specified period ("NO" of 84), TCP socket 28 sends a third keep-alive segment on the TCP connection (86). TCP socket 28 may then wait a specified period and then determine whether TCP socket 28 received a response to the third keep-alive segment (88). If TCP socket 28 received a response to the third keep-alive segment ("YES" of 88), TCP socket 28 sets the timestamp to the current time (72) and continues waiting (74). If TCP socket 28 did not receive a response to the third keep-alive segment in the specified period ("NO" of 88), TCP socket 28 sends a final keep-alive segment on the TCP connection (90). TCP socket 28 may then wait a specified period and then determine whether TCP socket 28 received a response to the final keep-alive segment (92). If TCP socket 28 received a response to the final keep-alive segment ("YES" of 92), TCP socket 28 sets the timestamp to the current time (72) and continues waiting (74). If TCP socket 28 does not receive a response to the final keep-alive segment ("NO" of 92), TCP socket 28 closes, terminating the TCP connection (94).

Various embodiments of the invention have been described. For instance, embodiments have been described in terms of TCP connections. Nevertheless the scope of the invention is not limited to TCP connections. For instance, the invention may be applicable to HyperText Transfer Protocol, or Datagram Congestion Control Protocol, and so on. These and other embodiments are within the scope of the following claims.

The invention claimed is:

1. A method comprising:
   storing, with a proxy device, respective wait times for a plurality of classes of network connections for a network protocol, wherein each of the wait times defines a time to wait before initiating a process to determine whether a network connection for the respective classes of network connections has failed, and wherein at least two of the wait times for the plurality of classes of network connections specify different wait times;
   defining a first one of the classes of network connections as a class of network connections between the proxy device and a set of client devices;

defining a second one of the classes of network connects as a class of network connections between the proxy device and a set of server devices; and
automatically setting the wait time for the class of network connections with the client devices less than the wait time for the class of network connections with the server devices;
receiving with the proxy device a request from a network device to establish a network connection;
analyzing the request with the proxy device to identify one of the plurality of classes of network connections to which the requested network connection belongs;
establishing a socket with the proxy device for the network connection to the network device, wherein the network connection is established to have the wait time associated with identified one of the plurality of classes of network connections; and
initiating the process to determine whether the network connection has failed when the wait time for the identified one of the plurality of classes of network connections has passed since a last successful communication on the network connection.

2. The method of claim 1, wherein the socket comprises a first socket and the network connection comprises a first network connection, the method further comprising:
establishing, with the proxy device, a second socket for a network connection to a third network device, wherein the network connection is associated with a second one of the plurality of classes of network connections for the network protocol; and
initiating a process to determine whether the second network connection has failed when the second amount of time has passed since a last successful communication on the second network connection.

3. The method of claim 1, wherein the wait times for at least one of the plurality of classes of network connections is specified as a ratio of the wait time for a different one of the classes of network connections.

4. The method of claim 1, further comprising:
defining the different classes of network connections for different sub-networks for source network addresses of the network connections; and
setting the wait times for each of the classes of network communications based on the sub-networks.

5. The method of claim 1, further comprising:
defining the different classes of network connections for different application-layer protocols; and
setting the wait times for each of the classes of network communications based on the different application-layer protocols.

6. The method of claim 1, wherein the method further comprises:
receiving input specifying the wait times for each of the plurality of classes of network connections.

7. The method of claim 6, wherein receiving input comprises:
receiving the input from a human administrator through an administrative interface.

8. The method of claim 1, wherein the method further comprises:
collecting statistical information from current network connections of the proxy device;
calculating the wait times for the plurality of classes of network connections based on the statistical information.

9. The method of claim 8, wherein the method further comprises:

automatically identifying a new class of network connections based on the statistical information by identifying a set of the current network connections having a substantially similar time until failure that is different from the wait times for the currently defined plurality of classes of network connections; and
calculating a wait time for the new class of network connections based on the statistical information.

10. The method of claim 8, wherein the method further comprises:
automatically merging two or more of the classes of network connections into fewer classes of network connections when the statistical information for the current network connections indicate the two or more classes of network connections have a substantially similar time until closure.

11. The method of claim 1, wherein analyzing the request comprises:
determining criteria based on at least one of a source address, a destination address, a source port, a destination port and a protocol of the request; and
selecting one of the classes of network connections that matches the determined criteria.

12. The method of claim 1, wherein the network protocol comprises a Transmission Control Protocol (TCP).

13. The method of claim 1, wherein initiating a process to determine whether the network connection has failed comprises:
after expiration of the wait time for the network connection, initiating a process to send a keep-alive message on the network connection; and
determining that the network connection has failed when the proxy does not receive a response to the keep-alive message on the first network connection.

14. The method of claim 13,
wherein the keep-alive message is a final keep-alive segment; and
wherein the method further comprises:
prior to sending the final keep-alive segment, sending a first keep-alive segment on the first network connection;
waiting an idle time specified for the first class of network connections, wherein the idle time defines a time between keep-alive messages; and
sending the final keep-alive segment when the proxy device did not receive a response to the first keep-alive segment while waiting the specified period.

15. A proxy device comprising:
a programmable processor;
a memory storing respective wait times for a plurality of classes of network connections for a network protocol, wherein each of the wait times defines a time to wait before initiating a process to determine whether a network connection for the respective classes of network connections has failed, and wherein the plurality of classes of network connections include a first class of network connections between a set of client devices and the proxy device and a second class of network connections between the proxy device and a set of server devices;
a socket creation module executing on the processor to establish a first socket of the proxy device to manage a first network connection that is a member of the first class of network connections and to establish a second socket of the proxy device to manage a second network connection that is a member of the second class of network connections, wherein the socket creation module computes the wait time for the class of network connections with the client devices to be less than the wait time for the class of network connections with the server devices;

wherein the first socket determines whether the first network connection is still active when an amount of time that has passed since a last successful communication on the first network connection exceeds the wait time computed for the first class of network connections, wherein the second socket determines whether the second network connection is still active when an amount of time that has passed since a last successful communication on the second network connection exceeds the wait time computed for the second class of network connections.

16. The proxy of claim 15, wherein the network device further comprises an administrative interface to receive input on which the first time for the first class of network connection and the second time for the second class of network connection is based.

17. The proxy of claim 15, wherein the network device further comprises:
 a statistical collection module to collect statistical information about network connections of the network device; and
 an optimization module to calculate an optimum connection keep-alive wait time for the first class of network connections based on the statistical information.

18. The proxy of claim 17, wherein the optimization module automatically identifies a new class of network connections based on the statistical information and calculates an optimum connection keep-alive wait time for the new class of network connections based on the statistical information.

19. The proxy device of claim 15, wherein the socket creation module receives a request to establish a network connection and identifies the requested network connection as being a member of the first class of network connections.

20. The proxy device of claim 15, wherein the socket creation module creates the second socket to communicate to a second device information received from the first network connection.

21. The proxy device of claim 15, wherein the network protocol comprises a Transmission Control Protocol.

22. The proxy device of claim 15, wherein the first network socket determines whether the first network connection is still active by sending a keep-alive message on the first network connection and by determining that the network connection is no longer active when the network device does not receive a response to the keep-alive message on the first network connection.

23. The proxy device of claim 22, wherein the keep-alive message is a final keep-alive segment and wherein the first network socket determines whether the first network connection is still active by further sending a first keep-alive message on the first network connection, waiting a period specified for the first class of network connections, and sending the final keep-alive segment when the network device did not receive a response to the first keep-alive message while waiting the specified period.

24. A non-transitory computer-readable medium comprising instructions, the instructions causing a programmable processor to:
 store, with a proxy device, respective wait times for a plurality of classes of network connections for a network protocol, wherein each of the wait times defines a time to wait before initiating a process to determine whether a network connection for the respective classes of network connections has failed, and wherein at least two of the wait times for the plurality of classes of network connections specify different wait times;
 define a first one of the classes of network connections as a class of network connections between the proxy device and a set of client devices;
 define a second one of the classes of network connects as a class of network connections between the proxy device and a set of server devices;
 automatically setting the wait time for the class of network connections with the client devices less than the wait time for the class of network connections with the server devices;
 establish a first socket to manage a first network connection that is a member of the first class of network connections in a network protocol;
 establish a second socket of the network device to manage a second network connection that is a member of the second class of network connections in the network protocol;
 determine whether the first network connection is still active when an amount of time equal to a first time for the first class of network connections has passed since a last successful communication on the first network connection; and
 determine whether the second network connection is still active when an amount of time equal to a second time for the second class of network connections has passed since a last successful communication on the second network connection.

\* \* \* \* \*